US012801575B2

(12) United States Patent
Mizrachi et al.

(10) Patent No.: US 12,801,575 B2
(45) Date of Patent: Nov. 17, 2026

(54) SYSTEM AND METHOD FOR MULTIPLE POINT-IN-TIME FILE SYSTEM EXPLORER

(71) Applicant: EON IO Ltd., Tel Aviv (IL)

(72) Inventors: Ran Mizrachi, Mishmar Hashiva (IL); Benjamin Gruenbaum, Herzliya (IL); Ron Kimchi, Tel Aviv (IL); Ofir Ehrlich, Tel Aviv (IL); Assaf Natanzon, Tel Aviv (IL)

(73) Assignee: EON IO Ltd., Tel Aviv (IL)

( * ) Notice: Subject to any disclaimer, the term of this patent is extended or adjusted under 35 U.S.C. 154(b) by 0 days.

(21) Appl. No.: 18/965,840

(22) Filed: Dec. 2, 2024

(65) Prior Publication Data

US 2026/0154241 A1 Jun. 4, 2026

(51) Int. Cl.
*G06F 16/18* (2019.01)
*G06F 16/11* (2019.01)
*G06F 16/14* (2019.01)

(52) U.S. Cl.
CPC ........ *G06F 16/1873* (2019.01); *G06F 16/128* (2019.01); *G06F 16/152* (2019.01)

(58) Field of Classification Search
CPC ... G06F 16/1873; G06F 16/128; G06F 16/152
USPC .......................................................... 707/822
See application file for complete search history.

(56) References Cited

U.S. PATENT DOCUMENTS 6,363,400 B1 3/2002 Chtchetkine et al.
7,890,469 B1 * 2/2011 Maionchi ................ G06F 16/10 707/654
7,904,466 B1 * 3/2011 Valencia ............. G06F 16/1734 707/758
8,335,775 B1 * 12/2012 Sedlar ................. G06F 21/6218 715/229
9,015,123 B1 * 4/2015 Mathew ................ G06F 16/178 707/646
9,026,496 B1 * 5/2015 Bachu ................... G06F 16/122 707/645
9,135,118 B2 * 9/2015 Skillcorn ............ G06F 11/1448
(Continued)

FOREIGN PATENT DOCUMENTS

JP 2005316815 A * 11/2005
TW I789168 B * 1/2023 ......... G06F 16/1873
(Continued)

OTHER PUBLICATIONS

U.S. Appl. No. 18/965,849, filed Dec. 2, 2024.
U.S. Appl. No. 18/965,859, filed Dec. 2, 2024.
U.S. Appl. No. 19/071,306, filed Mar. 5, 2025.

*Primary Examiner* — Phuong Thao Cao
(74) *Attorney, Agent, or Firm* — M&B IP Analysts, LLC

(57) ABSTRACT

In one embodiment, a method comprises responsive to a request, accessing a storage backup log, the storage backup log comprising indications of changes to files of a plurality of storage backups relative to previous storage backups, wherein each storage backup of the plurality of storage backups is associated with a different point-in-time; and responsive to the request, utilizing the storage backup log to generate a representation of at least a portion of a file system at multiple points in time, wherein the representation includes indications of a first file in existence at a point-in-time, a second file deleted prior to the point-in-time, and a third file created after the point-in-time.

20 Claims, 8 Drawing Sheets

(56) References Cited

U.S. PATENT DOCUMENTS

| | | | | |
|---|---|---|---|---|
| 9,336,143 | B1 | 5/2016 | Wallace et al. | |
| 9,430,229 | B1 * | 8/2016 | Van Zijst | G06F 9/3844 |
| 10,437,791 | B1 * | 10/2019 | Bebchuk | G06F 16/1734 |
| 10,514,985 | B1 * | 12/2019 | Patwardhan | G06F 11/1451 |
| 10,977,218 | B1 * | 4/2021 | Umstot | G06F 16/1873 |
| 11,341,009 | B1 | 5/2022 | Wu et al. | |
| 11,632,394 | B1 | 4/2023 | Rodriguez et al. | |
| 2005/0080823 | A1 * | 4/2005 | Collins | G06F 16/1787 |
| 2005/0223277 | A1 | 10/2005 | Ballard | |
| 2006/0167949 | A1 * | 7/2006 | Berger | G06F 16/10 |
| 2007/0050329 | A1 * | 3/2007 | Chikusa | G06F 16/128 |
| 2009/0144342 | A1 * | 6/2009 | Sudhakar | G06F 16/1873 707/999.203 |
| 2009/0182785 | A1 * | 7/2009 | Aston | G06F 16/1873 707/999.203 |
| 2010/0306171 | A1 * | 12/2010 | Antos | G06F 11/1448 711/E12.001 |
| 2011/0040812 | A1 * | 2/2011 | Phillips | G06F 9/45541 707/822 |
| 2017/0031928 | A1 | 2/2017 | Koeninger | |
| 2017/0123933 | A1 * | 5/2017 | Gallagher | G06F 11/1446 |
| 2017/0180394 | A1 | 6/2017 | Crofton et al. | |
| 2018/0267985 | A1 * | 9/2018 | Badey | G06F 16/128 |
| 2019/0095455 | A1 * | 3/2019 | Barreto | G06F 11/1446 |
| 2019/0332781 | A1 * | 10/2019 | Natanzon | G06F 11/1446 |
| 2020/0233751 | A1 * | 7/2020 | Gupta | G06F 16/9027 |
| 2022/0066422 | A1 * | 3/2022 | Kunnath | G06F 9/451 |
| 2023/0119329 | A1 | 4/2023 | Koch et al. | |
| 2023/0147026 | A1 * | 5/2023 | Munshani | G06F 11/1451 714/15 |
| 2023/0208662 | A1 | 6/2023 | Choi | |
| 2023/0401127 | A1 | 12/2023 | Kumar et al. | |
| 2024/0004540 | A1 | 1/2024 | Kakoti et al. | |
| 2024/0045964 | A1 | 2/2024 | Bednash et al. | |
| 2024/0061820 | A1 * | 2/2024 | Dash | G06F 16/252 |
| 2024/0111633 | A1 | 4/2024 | Yadav et al. | |
| 2024/0111636 | A1 | 4/2024 | Yadav et al. | |
| 2024/0134670 | A1 | 4/2024 | Su et al. | |
| 2024/0232141 | A1 * | 7/2024 | Dillon | G06F 16/1873 |
| 2024/0256670 | A1 | 8/2024 | Jindal et al. | |
| 2024/0311472 | A1 | 9/2024 | Zhang et al. | |
| 2024/0427810 | A1 | 12/2024 | Tishbi et al. | |
| 2025/0036532 | A1 | 1/2025 | Farr et al. | |
| 2025/0181719 | A1 | 6/2025 | Gee et al. | |
| 2025/0238513 | A1 | 7/2025 | Randolph et al. | |
| 2025/0328492 | A1 * | 10/2025 | Ramasubramaniam | G06F 16/128 |
| 2025/0356009 | A1 | 11/2025 | Gee et al. | |
| 2025/0356010 | A1 | 11/2025 | Gee et al. | |
| 2026/0023853 | A1 | 1/2026 | Kandiraju et al. | |
| 2026/0119068 | A1 | 4/2026 | Pai et al. | |
| 2026/0154405 | A1 | 6/2026 | Massiglia et al. | |
| 2026/0187240 | A1 | 7/2026 | Bednash et al. | |
| 2026/0203148 | A1 | 7/2026 | Kotni et al. | |
| 2026/0203259 | A1 | 7/2026 | Jana et al. | |

FOREIGN PATENT DOCUMENTS

| | | | | |
|---|---|---|---|---|
| WO | WO-2019059994 | A1 * | 3/2019 | G06F 16/128 |
| WO | WO-2022046805 | A1 * | 3/2022 | G06F 8/38 |
| WO | WO-2024153335 | A1 * | 7/2024 | G06F 11/2094 |
| WO | WO-2025087531 | A1 * | 5/2025 | G06F 11/1471 |

* cited by examiner

500

| | File Path | File Name | Creation/Update Time | Deletion Time | File Size | Hash | File System ID |
|---|---|---|---|---|---|---|---|
| 502A | /DIR 1 | FILE 1.TXT | 3/14/2023 5:45:00 PM | | 37 | 0x23555125 | 1 |
| 502B | /DIR 1 | FILE 2.TXT | 3/14/2023 5:45:00 PM | | 6339 | 0x65138746 | 1 |
| 502C | /DIR 2 | FILE 3.TXT | 3/14/2023 5:45:00 PM | | 1402 | 0x98751354 | 1 |
| 502D | /DIR 2 | FILE 4.TXT | 3/14/2023 5:45:00 PM | | 9993 | 0x12354864 | 1 |
| 502E | /DIR 1 | FILE 2.TXT | | 3/21/2023 5:45:00 PM | 6339 | 0x65138746 | 1 |
| 502F | /DIR 2 | FILE 3.TXT | | 3/28/2023 5:45:00 PM | 1402 | 0x98751354 | 1 |
| 502G | /DIR 2 | FILE 4.TXT | | 3/28/2023 5:45:00 PM | 9993 | 0x12354864 | 1 |
| 502H | /DIR 2 | . | | 3/28/2023 5:45:00 PM | | | 1 |
| 502I | /DIR 3 | . | 3/28/2023 5:45:00 PM | | | | 1 |
| 502J | /DIR 3 | FILE 3.TXT | 3/28/2023 5:45:00 PM | | 1402 | 0x98751354 | 1 |
| 502K | /DIR 3 | FILE 4.TXT | 3/28/2023 5:45:00 PM | | 9993 | 0x12354864 | 1 |
| 502L | /DIR 1 | FILE 5.TXT | 4/4/2023 5:45:00 PM | | 6476 | 0x98112785 | 1 |
| 502M | /DIR 1 | FILE 1.TXT | 4/4/2023 5:45:00 PM | | 310 | 0x19872314 | 1 |

FIG. 5

SYSTEM AND METHOD FOR MULTIPLE POINT-IN-TIME FILE SYSTEM EXPLORER

TECHNICAL FIELD

This disclosure relates in general to the field of data backup and recovery and, more particularly, to a multiple point-in-time file system explorer.

BACKGROUND

Cloud data backup is the process of creating and storing copies of data in a remote, cloud-based environment to ensure data availability, protection, and recovery in case of failure or data loss. While organizations may utilize traditional on-premises backups, cloud backups offer greater flexibility and scalability, allowing businesses to adjust storage as needed and access their data from anywhere with an internet connection. Cloud backups typically provide automated processes, encryption, and redundancy across multiple servers, enhancing both security and reliability. This ensures that businesses can recover their data quickly, minimizing downtime and mitigating the risk of data breaches or corruption. Cloud data backup may also be the most efficient way to backup workloads which are running natively in the cloud.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 5 illustrates a storage backup log for a multiple point-in-time file system explorer, in accordance with any of the embodiments disclosed herein.

DETAILED DESCRIPTION OF EXAMPLE EMBODIMENTS

Figure 1:
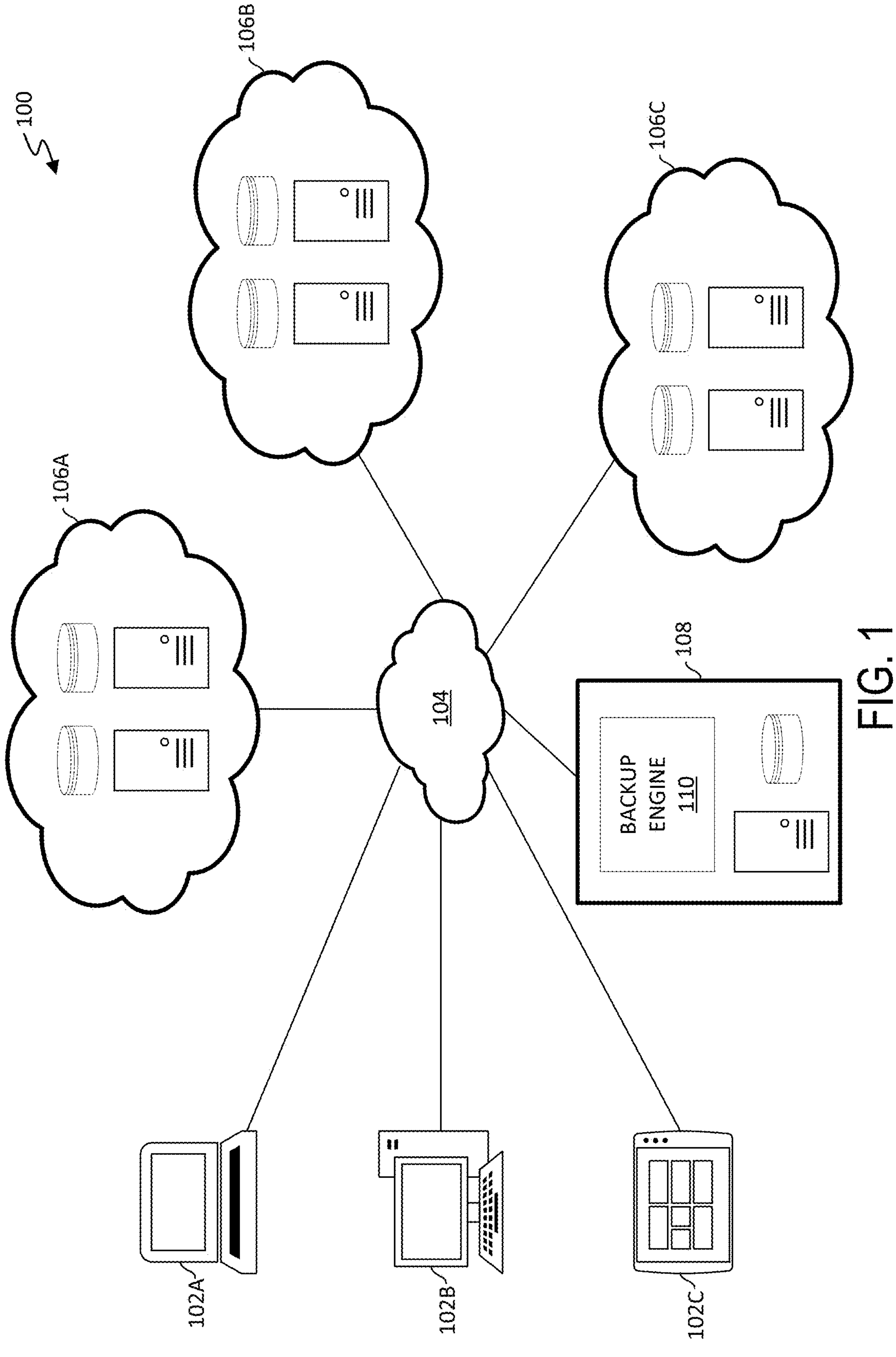
FIG. 1 illustrates a block diagram of a cloud data backup environment, in accordance with any of the embodiments disclosed herein.

FIG. 1 illustrates a block diagram of a cloud data backup environment 100, in accordance with any of the embodiments disclosed herein. An organization (e.g., any one or more users associated with each other) may utilize any number of storage collections with file systems that include data (e.g., directories and files) accessed by users associated with the organization. The users may interact with the data using computing devices 102 (e.g., 102A, 102B, 102C).

The data may be stored (temporarily or persistently) at a site owned or leased by the organization (e.g., "on premises"), at another location (e.g., owned or managed by a cloud service provider), or at multiple locations. The data of an organization may be backed up in the cloud, e.g., within a backend 106 (e.g., 106A, 106B, 106C) of a cloud backup service provider, across multiple backends of the same cloud backup service provider, at one or more backends of a different cloud backup service provider, at another suitable location (e.g., at a local site or device of the organization), or any combination thereof (e.g., some data may be backed up at backend 106A, other data may be backed up at backend 106B, and some data may be backed up at a local site). In some instances, the organization may also have data that is not backed up (but rather stored locally, in the cloud, or otherwise).

When a user is navigating within a file explorer in a file system that has been backed up (e.g., in the cloud, in on-premises storage, in a portable hard drive, etc.), the view of the directories and files within the file explorer are typically limited to a single point-in-time. For example, the user may view the current directories and files or may view the directories and files that are backed up by a particular instance of a series of backups. Accordingly, it may be difficult for a user to understand the history of the directories and files without manually navigating through each backup. Moreover, a file may have been deleted at some point and if the user does not know the name of the file (or the backup utility does not support searching by file name across the different backups), the user may have to manually browse multiple backups in order to locate the file.

Various embodiments provide a multiple point-in-time file system explorer that provides a view of a file system at multiple points in time simultaneously. Through this explorer, a user may be provided a wholistic view of the evolution of the file system. In some embodiments, a reference point-in-time may be specified (e.g., by the user) and the file system explorer may display the directories and files from the perspective of the reference point-in-time. Directories and files that were (or are) in existence at the reference point-in-time may be displayed in a first format (e.g., a standard format). However, the file system explorer may also display directories and files that were deleted prior to the reference point-in-time and/or directories and files that were created after the reference point-in-time. In some instances, these directories and files may be formatted differently from the directories and files that are in existence at the reference point-in-time to enable the user to easily detect changes that occurred prior to and/or after the reference point-in-time. Thus, a user may browse the file system at multiple points in time simultaneously, greatly enhancing the ability of the user to locate desired files or directories that have changed over time.

Various embodiments may provide one or more technical advantages such as faster identification of files or directories, decreased usage of computing and/or network resources (e.g., power, bandwidth) when searching for and accessing files or directories, or other technical advantages.

In the depicted embodiment, the cloud data backup environment 100 includes a data backup and search system 108. The data backup and search system 108 may provide any suitable features of the multiple point-in-time file system explorer described herein. In some embodiments, the data backup and search system 108 may include a backup engine 110 that is to detect initiations of backups and, in response, record changes of the data collection backed up by the backup in a storage backup log (e.g., as described below). The backup engine 110 may also perform the actual backup as well and/or may communicate with other logic to perform the backup. In various embodiments, backup engine 110 may be included, in whole or in part, within the data backup and search system 108, within a backend 106, at a computing device 102, at another suitable location within cloud data backup environment 100, or at any combination thereof. The backup engine 110 may be implemented by one or more computing devices, such as computing device 300 described below.

In various embodiments, any of the features of the multiple point-in-time file system explorer or a subset thereof may be performed by any other suitable logic, such as computing devices within one of the backends 106, by a computing device 102 (e.g., through a web application or native application that interfaces with the data backup and search system 108), by other suitable logic, or by any suitable combination of these and/or the data backup and search system 108.

The data backup and search system 108 may receive requests from one or more computing devices 102 over network 104 to backup data and in response may initiate backups in one or more of backends 106 (or other locations) as well as store data representing changes across the various backups at different points in time to provide the multiple point-in-time file system explorer. The data backup and search system 108 may also interact with the computing devices 102 to provide the multiple point-in-time file system explorer. For example, the data backup and search system 108 may receive input from a user browsing backed up data in a multiple point-in-time file system explorer on a computing device 102 and may update the view provided to the user based on the input from the user and the data representing the changes in the backups at the multiple points in time. The data backup and search system 108 may also be operable to restore (or at least initiate restoration of) data from backups based on requests from users made in the multiple point-in-time file system explorer.

Data backup and search system 108 may include any suitable number of computing devices to perform the functions described herein. In a particular embodiment, the data backup and search system 108 may comprise a cluster of nodes (e.g., physical or virtual machines) in a Kubernetes environment, although any suitable computing environment may be used to implement the data backup and search system 108. The data backup and search system 108 may include and/or manage a plurality of accounts, where a particular account may be associated with (e.g., owned or controlled by) a particular organization. Data used to provide the multiple point-in-time file system explorer (e.g., storage backup logs) for a particular organization may be stored in the account owned by that organization. In various embodiments, the data backup and search system 108 may be separate from the backends 106 or could be implemented (at least in part) within one of the backends 106.

Computing devices 102 may include any electronic computing device operable to receive, transmit, process, and store any appropriate data. In various embodiments, computing devices 102 may be mobile devices or stationary devices. As examples, mobile devices may include laptop computers, tablet computers, smartphones, personal digital assistants, and other devices capable of connecting (e.g., wirelessly) to network 104 while stationary devices may include desktop computers or other devices that are not easily portable. Computing devices 102 may include a set of programs such as operating systems (e.g., Microsoft Windows, Linux, Android, Mac OSX, Apple iOS, UNIX, or other operating system), applications, and other software-based programs capable of being run, executed, or otherwise used by the respective devices. A computing device may include at least one graphical display and user interface allowing a user to view and interact with applications and other programs of the computing device to perform operations associated with one or more data (e.g., searching for data, modifying data contents, reading data contents, initiating data backups, etc.).

FIG. 1 also depicts a network 104 that couples the computing devices 102, backends 106, and data backup and search system 108 together. The network 104 may transport communications between computing devices 102, the various backends 106, and the data backup and search system 108.

Figure 2:
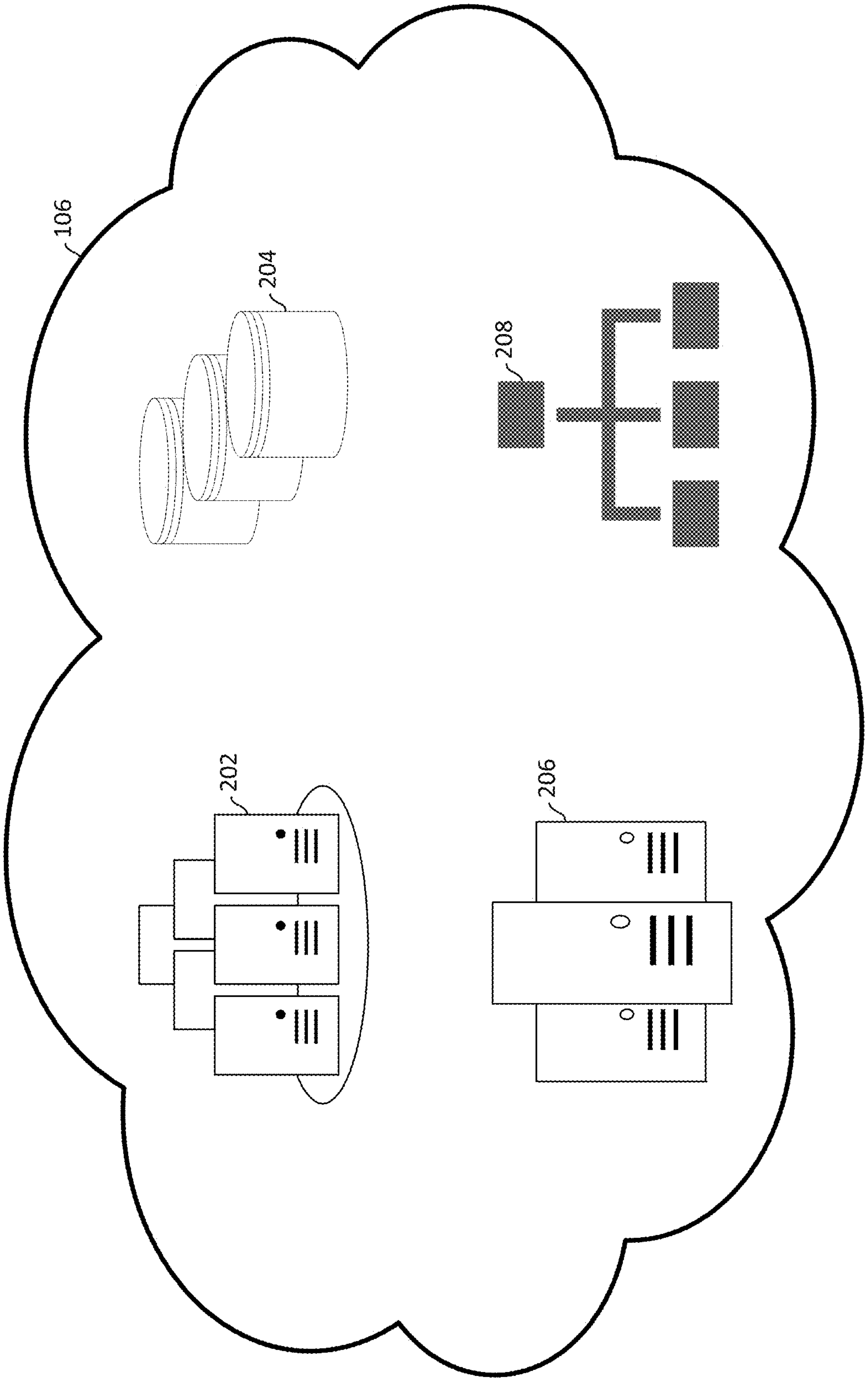
FIG. 2 illustrates a block diagram of a backend of a cloud backup service provider of the environment of FIG. 1, in accordance with any of the embodiments disclosed herein.

FIG. 2 illustrates a block diagram of a backend 106 of a cloud backup service provider of the environment of FIG. 1, in accordance with any of the embodiments disclosed herein. Backend 106 may include various computing systems to provide services (including data backup services) to various organizations. In the embodiment depicted, backend 106 includes compute resources 202, storage resources 204, operations computing systems 206, and networking resources 208.

Compute resources 202 may include hardware components used to provide cloud services, such as general-purpose processors (e.g., central processing units (CPUs), server processors, accelerated processing units (APUs), controllers), specialized processors (e.g., graphics processing units (GPUs), application-specific integrated circuits (ASICs), digital signal processors (DSPs), field programmable gate arrays (FPGAs), neural network processing units (NPUs), data processor units (DPUs), controller cryptoprocessors (specialized processors for cryptographic algorithms)), or accelerators (e.g., graphics accelerators, compression accelerators, artificial intelligence accelerators), or other hardware components.

Storage resources 204 may provide the storage and retrieval of data (e.g., data (including backups) or associated data). Storage resources 204 may include hardware, such as hard disk drives, solid-state drives, tape storage, or other suitable mechanisms for storing data. Storage resources 204 may store any suitable data in any suitable format(s). For example, storage resources 204 may provide object, block, or file storage.

Operations computing systems 206 may include any suitable computing systems to manage the various operations of the backend, such as coordination of incoming and outgoing communications; allocation of compute, storage, and networking resources; monitoring of usage; application deployment; enforcement of security (e.g., identity and access management (IAM), encryption and key management, intrusion detection), and other management tasks.

Networking resources 208 may include any suitable hardware or software to facilitate communication among compute resources 202, storage resources 204, and/or other cloud resources of the backend. Networking resources 208 may include, e.g., routers, switches, firewalls, load balancers, gateways, edge devices, network interface cards, and other suitable networking hardware.

The compute resources 202, storage resources 204, and networking resources 208 may be used to provide compute services to clients of the service provider, such as virtual machines, containers, bare metal servers, or serverless computing.

In various embodiments, a backend 106 is managed by a third party. For example, a backend 106 may be deployed using a cloud service such as Amazon Web Services, Microsoft Azure, or Google Cloud Platform. A backend 106 may provide services to organizations using any suitable service model, such as infrastructure as a service (IaaS), platform as a service (PaaS), or software as a service (Saas), or combinations thereof.

In IaaS, on-demand access is provided to essential information technology (IT) infrastructure, such as servers, storage, and networking, over a virtual interface. Users do not need to manage or maintain physical infrastructure, as it is hosted and managed by the cloud service provider. While the provider handles the underlying hardware and maintenance, users retain control over operating systems, storage, and applications they deploy. This eliminates the need for organizations to manage on-premises infrastructure, offering flexibility and scalability.

In PaaS, a development and deployment environment is provided, including the necessary infrastructure and software tools, for creating and managing applications. Users can develop and run cloud-based applications without managing the underlying infrastructure, such as servers, networks, and storage. PaaS is typically accessed on a pay-as-you-go basis and allows users to focus on application deployment and management, while the cloud provider handles the infrastructure and software maintenance.

In SaaS, users access cloud-based applications provided and maintained by a service provider. Instead of installing software locally, users access the applications via the web or application programming interface (API) on a subscription basis. In this model, the service provider oversees the hardware, software, middleware, and security, eliminating the need for end users to manage or update the software themselves.

An organization may utilize one or more backends 106 to provide data backup for the organization. Data backup is the process of creating a copy of the data that can be used to restore the data in case of data loss, corruption, or other disasters. Backups are essential for data protection, disaster recovery, and ensuring business continuity.

Various types of backups may be performed on the data of an organization. In a full backup, a complete copy of the entire data collection covered by the backup is saved in the backup storage. This is the most comprehensive type of backup but can be time consuming and storage intensive. In an incremental backup, only the data that has changed since the last backup on the data collection (either full or incremental) is saved in the backup storage. This reduces the amount of data to be backed up and speeds up the backup process. In a differential backup, all of the data that has changed in the data collection since the last full backup is saved in the backup storage. This is faster than a full backup but can grow in size over time until the next full backup.

An organization may utilize various backup strategies (and could utilize different backup strategies for different data collections). For example, in a full backup strategy, full backups are regularly performed. This strategy may be suitable for small data where backup time and storage size are not significant concerns. In an incremental backup strategy, a full backup may be performed periodically (e.g., weekly) and incremental backups are performed more often (e.g., daily). This reduces backup time and storage requirements. In a differential backup strategy, a full backup is performed periodically (e.g., weekly) and differential backups are performed more often (e.g., daily). This strategy provides a balance between backup time and storage. In a mixed strategy, various types of strategies (e.g., full, incremental, and transaction log backups) may be combined to optimize backup and recovery times.

An organization may utilize any suitable data backup tool to implement their desired backup strategies and to create data backups that are stored on a backend 106 or other location. Various such tools include, e.g., rsync (a command-line utility for Unix-based systems that synchronizes files and directories between two locations), tar (a Unix utility used to create archive files), Bacula, Amanda, Veeam, and Acronis.

Figure 3:
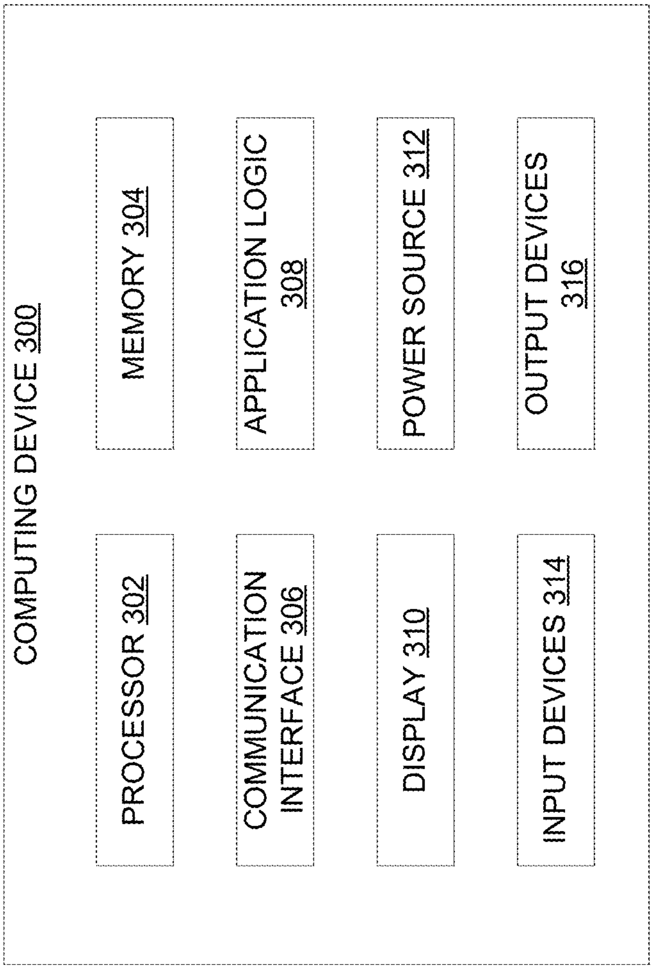
FIG. 3 illustrates a block diagram of a computing device of FIG. 1, in accordance with any of the embodiments disclosed herein.

FIG. 3 illustrates a block diagram of a computing device 300, in accordance with any of the embodiments disclosed herein. One or more computing devices 300 (or portions or alternatives thereof) may be used to implement a computing device 102, one or more portions of data backup and search system 108, or one or more portions of backends 106. As used in this document, the term computing device is intended to encompass any suitable processing device. A computing device 300 may be operable to receive, transmit, process, store, or manage data and information associated with cloud data backup environment 100.

In the depicted embodiment, computing device 300 includes one or more processors 302, memories 304, communication interfaces 306, application logic 308, display 310, power source 312, input devices 314, and output devices 316, among other hardware and software. These components may work together in order to provide any suitable functionality described herein.

A processor 302 may be any suitable computing device, resource, or combination of hardware, stored software and/or encoded logic operable to provide, either alone or in conjunction with other components of computing device 300, the functionality of the computing device. In particular embodiments, computing device 300 may utilize multiple processors to perform the functions described herein. In various embodiments, processor 302 may include one or more general-purpose processors (e.g., CPUS, server processors, APUs, controllers), specialized processors (e.g., GPUs, general-purpose GPUs, ASICs, DSPs, FPGAs, NPUs, DPUs, controller cryptoprocessors (specialized processors for cryptographic algorithms)), or accelerators (e.g., graphics accelerators, compression accelerators, artificial intelligence accelerators).

A processor can execute any type of instructions to achieve the operations detailed in this specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an application specific integrated circuit (ASIC) that includes digital logic, software, code, electronic instructions, or any suitable combination thereof.

Memory 304 may comprise any form of non-volatile or volatile memory including, without limitation, random access memory (RAM), read-only memory (ROM), magnetic media (e.g., one or more disk or tape drives), optical media, solid state memory (e.g., flash memory), removable media, or any other suitable local or remote memory component or components. Memory 304 may store any suitable data or information utilized by a computing device 300, including software embedded in a (e.g., non-transitory) computer readable medium, and/or encoded logic incorporated in hardware or otherwise stored (e.g., firmware). Memory 304 may also store the results and/or intermediate results of the various calculations and determinations performed by processor 302.

Communication interface 306 may be used for the communication of signaling and/or data between computing devices and one or more networks and/or network nodes coupled to a network or other communication channel. For example, communication interface 306 may be used to send and receive network traffic such as data packets. Each communication interface 306 may send and receive data and/or signals according to a distinct standard such as an LTE, IEEE 802.11, IEEE 802.3, or other suitable standard. In some instances, communication interface 306 may include antennae and other hardware for transmitting and receiving radio signals to and from other devices in connection with a wireless communication session over one or more networks.

Application logic 308 may include logic providing, at least in part, the functionality of the computing device. In a particular embodiment, the logic of a computing device 300 may include software (e.g., a web browser, an application, an operating system, etc.) that is executed by processor 302. However, "logic" as used herein, may include but not be limited to hardware, firmware, software and/or combinations of each to perform a function(s) or an action(s), and/or to cause a function or action from another logic, method, and/or system. In various embodiments, logic may include a software controlled microprocessor, discrete logic (e.g., an application specific integrated circuit (ASIC)), a programmed logic device (e.g., a field programmable gate array (FPGA)), a memory device containing instructions, combinations of logic devices, or the like. Logic may include one or more gates, combinations of gates, or other circuit components. Logic may also be fully embodied as software.

Display 310 may include one or more embedded or connected (e.g., via a wired or wireless connection) external visual indicators, such as a computer monitor, a touchscreen display, a liquid crystal display (LCD), a light-emitting diode display, or a flat panel display.

Power source 312 may include one or more energy storage devices (e.g., batteries or capacitors) and/or circuitry for coupling components of the computing device 300 to an energy source separate from the computing device 300 (e.g., alternating current line power).

An input device 314 may accept input from a source external to the computing device 300. Examples of input devices 314 may include an image capture device, keyboard, cursor control device, touchscreen, and an audio device (e.g., microphone), to name a few.

An output device 316 may output signals based on information provided by computing device 300. Examples of output devices 316 include an audio device (e.g., a speaker), an audio codec, a video codec, a printer, a transmitter for providing information to other devices, a storage device, to name a few.

Figure 4:
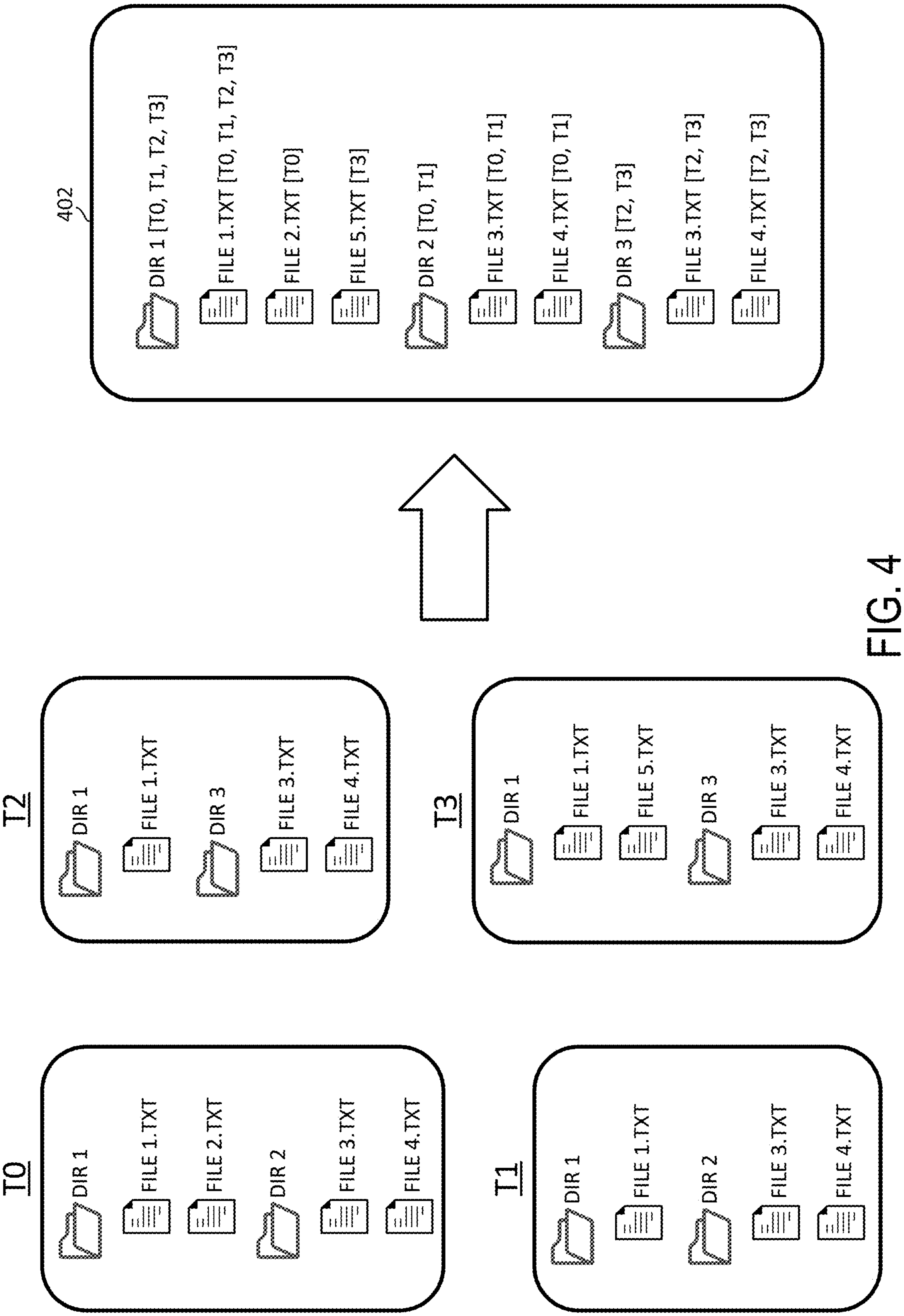
FIG. 4 illustrates an example data backup sequence, in accordance with any of the embodiments disclosed herein.

FIG. 4 illustrates an example data backup sequence, in accordance with any of the embodiments disclosed herein. This sequence shows the evolution of files and directories of a particular path and a multiple point-in-time file system explorer 402.

When a first backup of a storage collection is performed at time T0, the path of the source storage device that is to be backed up (e.g., the root directory) includes a first directory DIR 1 which includes a first file FILE 1.TXT and a second file FILE 2.TXT as well as a second directory DIR 2 which includes a third file FILE 3.TXT and a fourth file FILE 4.TXT.

In between time T0 and the next storage backup performed at time T1, FILE 2.TXT is deleted at the source storage device. Then, prior to the next storage backup performed at time T2, the directory DIR 2 is renamed to DIR 3. Finally, a fifth file FILE 5.TXT is added to the directory DIR 1 prior to the storage backup performed at T3.

Responsive to the backups, the data backup and search system 108 may store associations between the files and directories present during each of the backups and the points in time of the backups. These stored associations may enable provision of the multiple point-in-time file system explorer. Thus, for directory DIR 1, the multiple point-in-time file system explorer 402 indicates that DIR 1 and FILE 1.TXT were present in the backups at times T0, T1, T2, and T3, FILE 2.TXT was present at time T0, and FILE 5.TXT was present at T3. As depicted, DIR 2 and its files FILE 3.TXT and FILE 4.TXT were present at times T0 and T1. DIR 3 and its files FILE 3.TXT and FILE 4.TXT were present at times T2 and T3.

As depicted, the multiple point-in-time file system explorer 402 may be displayed in a format in which the directory names and file names are displayed along with indications of the points in time of the backups that include the directories and files. In some embodiments, the directories and files for all available backups may be presented within the multiple point-in-time file system explorer 402 and selecting a directory or file (e.g., with a right click of a mouse or other user activity) may result in a display of indications of the backups that include the selected directory or file (e.g., the indication may include the date and/or time of the backups or other temporal indication distinguishing the backups). An alternative interface for the multiple point-in-time file system explorer is described in connection with FIG. 6.

FIG. 5 illustrates a storage backup log 500 for a multiple point-in-time file system explorer, in accordance with any of the embodiments disclosed herein. In some embodiments, the storage backup log 500 may be stored at and/or maintained by data backup and search system 108, a backend 106, one or more computing devices 102, or other suitable logic. The storage backup log 500 may be updated each time a storage backup is performed. For example, in conjunction with performing a storage backup, the storage backup log 500 may be updated with changes that have been made to the files and directories covered by the backup relative to the most recent backup.

In this example, the storage backup log 500 is stored in a table of a relational database (e.g., a SQL database) in which each record 502 (e.g., row) of the storage backup log 500 corresponds to a change to a file or directory in the storage collection covered by the backup. A table may be a structured collection of related data organized in rows and columns. Each record (also referred to as a row) may represent a single entry in the table, while each column (also referred to as field or attribute) may represent a specific attribute of the data.

The records 502 in FIG. 5 track the sequence of FIG. 4. The log 500 includes columns including file path, file name, creation/update time, deletion time, file size, hash, and file system identifier (ID). In other embodiments, one or more of these columns may be omitted and/or the storage backup log 500 may include additional columns (e.g., a last modified column indicating the date/time the file or directory was last modified at the source or a created column indicating the date/time the file or directory was created at the source).

The file path may be a string that describes the location of a file or directory within a file system. It specifies the route or path to access the file, beginning from the root directory to the specific file or directory. The file path may be an absolute file path (e.g., a complete path from the root of the file system to the target file or directory) or a relative file path (e.g., a partial path starting from a directory other than the root directory). In the records 502 shown in FIG. 5, the file paths all start from a root directory represented by the "/" character.

The file name may be a specific name of a file and is typically expressed as a string (e.g., an alphanumeric string). The file name may also include an extension based on the type of the file (in this case ".TXT" for each file referenced in the storage backup log 500). When a record 502 corresponds to a directory (e.g., as is the case with records 502H and 502I), a default value (e.g., null, ".", etc.) may be stored in the file name field.

The creation/update time may include a date and/or time at which the file or directory was created or updated (if the change indicated by the record was a creation or update of a file or directory, otherwise this field may be null or some other predetermined value). In other embodiments, separate columns could be used for creation time and updated time. The deletion time may include a date and/or time at which the file or directory was deleted (if the change indicated by the record was a deletion of a file or directory, otherwise this field may be null or some other predetermined value).

The file size includes a size of the file or directory (e.g., in kilobytes or other unit). The file sizes for the directories may be null (as shown) or may also be included in this field (not shown).

The hash is a string (e.g., of a fixed length) of characters generated from the contents of the file using a hash function (e.g., a message digest algorithm, a secure hash algorithm, a checksum, or other suitable hash function). The hash serves as a unique fingerprint or identifier for that file and may typically be used by the backup engine 110 to distinguish between different versions of the same file.

The file system ID represents an ID of a file system to which the file or directory belongs. In some instances, a backup of a storage collection (e.g., of one or more computing systems) may encompass multiple file systems. Accordingly, the file system ID allows differentiation between the files and directories of the various file systems.

In particular embodiments, the storage backup log 500 may be dedicated to a particular backup series of the same storage collection. For example, the storage backup log 500 may be dedicated to backups of a particular machine, volume, drive, or other storage collection made at different points in time. In other embodiments, the storage backup log 500 could be used for multiple different backup series of different storage collections (e.g., of different machines, drives, etc.). In such a case the storage backup log 500 could include an additional field that includes an identifier of the storage collection that is being backed up through the backup series (e.g., a machine name, network address, etc.). In various embodiments, the storage backup log 500 may include any other suitable fields, such as a file creation time, a file last modified field, or other suitable fields.

When a storage collection is scanned in conjunction with a backup, each change in the storage device is identified and a record is made in the storage backup log 500 for the change. Such changes may include, e.g., a creation of a file or directory, a deletion of a file or directory, an update to contents of a file, a change in the title of a file or directory, and a change in the location of a file or directory. In various embodiments, a change in the location or title of a file or directory may be recorded in two records of the storage backup log 500, wherein a first record indicates a deletion of the file or directory in the previous location or with the previous title and a second record indicates a creation of the file or directory in the new location or with the new title.

Referring jointly to FIGS. 4 and 5, a first backup is performed on Mar. 14, 2023 at 5:45:00 PM (e.g., "T0"). If this backup is the first backup performed on the storage collection, then all files and directories may be detected as new and a record may be created for each file and directory that is backed up (where each record shows a creation of a file or directory). If the backup is not the first backup, then records 502 will be created for changes detected relative to the most recent backup on the storage device. In this instance, creation of FILE 1.TXT and FILE 2.TXT within /DIR 1 is detected and results in generation of records 502A and 502B. Similarly, creation of FILE 3.TXT and FILE 4.TXT within /DIR 2 is also detected and results in generation of records 502C and 502D. Each of records 502A-D includes a time of creation (Mar. 14, 2023 5:45:00 PM) equal to the time the backup is performed and no value (or a null value) in the deletion time column. These records also include respective file sizes and hash values as well as the same file system ID.

A second backup is performed on Mar. 21, 2023 at 5:45:00 PM (e.g., "T1"). The only change detected in this backup relative to the first backup is deletion of FILE 2.TXT. Accordingly, record 502E is added to the log to capture the deletion.

A third backup is performed on Mar. 28, 2023 at 5:45:00 PM (e.g., "T2"). In this backup, the changes relative to the second backup include the changing of the name of DIR 2 to DIR 3. Accordingly, records 502F and 502G recording the deletion of FILE 3.TXT and FILE 4.TXT within /DIR2 are generated. Additionally, record 502H recording the deletion of /DIR 2 is also generated. Record 502I recording the creation of /DIR 3 is generated and records 502J and 502K recording the creation of FILE 3.TXT and FILE 4.TXT within /DIR 3 are also generated to complete the records capturing the renaming of /DIR 2 to /DIR 3.

A fourth backup is performed on Apr. 4, 2003 at 5:45:00 PM (e.g., "T3"). In the fourth backup, the changes relative to the third backup include the creation of FILE 5.TXT within /DIR 1 and an update to FILE 1.TXT within /DIR 1. Record 502L captures the addition of FILE 5.TXT and record 502M captures the update to FILE 1.TXT. As evidenced by records 502A and 502M, the file size of FILE 1.TXT has changed from 37 KB to 310 kB and the hash value has also changed.

Storing the storage backup log 500 in a relational database may simplify provision of the multiple point-in-time file system explorer (although in various embodiments the storage backup log 500 may be stored in any suitable format). For example, when a user has selected a file path to view in the multiple point-in-time file system explorer 402, the storage backup log 500 may be searched (e.g., using one or more SELECT queries) using filters for the file path (and potentially other filters for the creation/update time and the deletion time) in order to obtain a list of files and directories across multiple points in time (that correspond to different backup versions). For example, all of the files that were created before or during a time span or a point-in-time specified by the user may be returned by one or more searches of the storage backup log 500 for display in the multiple point-in-time file system explorer 402. A search may also be made for files or directories that were deleted during the time span or at the point-in-time so that such files or directories may be marked as deleted in the multiple point-in-time file system explorer 402. Although not shown, in some embodiments, the records may be kept in storage backup log 500 by lexicographical order by file path (e.g., to improve query times).

Figure 6:
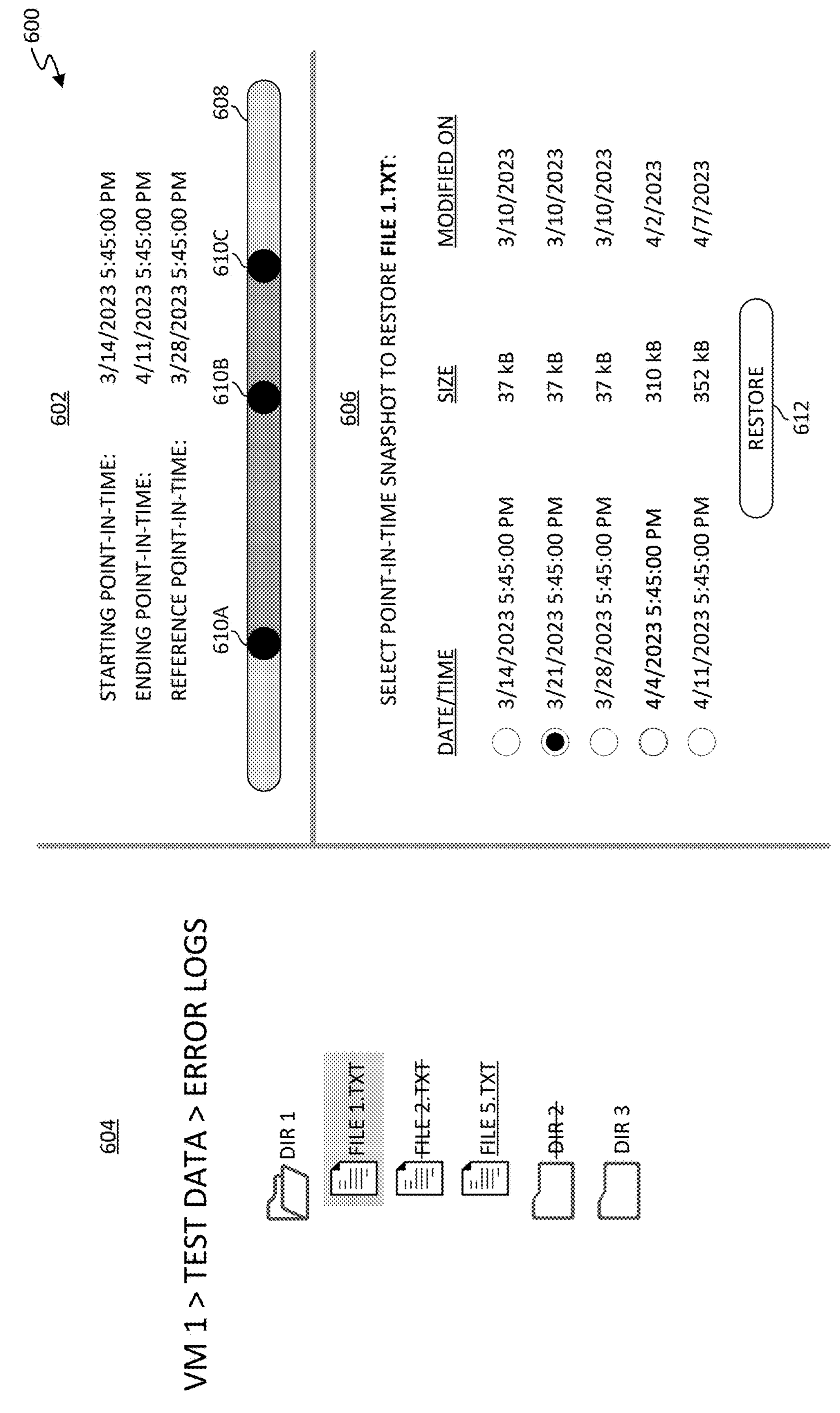
FIG. 6 illustrates a multiple point-in-time file system explorer, in accordance with any of the embodiments disclosed herein.

FIG. 6 illustrates a multiple point-in-time file system explorer 600, in accordance with any of the embodiments disclosed herein. The multiple point-in-time file system explorer 600 may include any suitable characteristics of multiple point-in-time file system explorer 402 or vice versa.

In this embodiment, the multiple point-in-time file system explorer 600 may be provided (e.g., displayed) to a user of a computing device 102 through a web application (e.g., accessed through a web browser executed by a computing device 102), through a native application executed by the computing device 102, or by other suitable means.

The multiple point-in-time file system explorer 600 includes a point-in-time selector portion 602, a file system explorer portion 604, and a restoration portion 606. The point-in-time selector portion 602 allows the user to specify one or both of a reference point-in-time and a time range (defined by a starting point-in-time and an ending point-in-time). In the embodiment depicted, a slider bar 608 allows a user to slide one or more nodes 610 (e.g., 610A, B, C) across a range between the point-in-time of the earliest backup and the point-in-time of the most recent backup of a particular storage collection. In this embodiment, node 610A may select a starting point-in-time, node 610B may select a reference point-in-time, and node 610C may select an ending point-in-time. Each of these points in time are displayed above the slider bar 608. In other embodiments, the point-in-times may be specified via any other interface (e.g., a calendar interface, a text entry field, a selection from a list of available points in time, etc.).

The results shown in the file system explorer portion 604 may be based on the reference point-in-time and/or the time range. In one embodiment, a reference point-in-time is selected. The results shown in the file explorer portion 604 are formatted based on the reference point-in-time. For example, current files and directories in existence in the backup performed at the reference point-in-time are displayed in a first format, files and directories deleted prior to the reference point-in-time are displayed in a second format, and files and directories created after the reference point-in-time are displayed in a third format. The formats may be different from each other so as to allow current (e.g., files or directories in existence in the backup performed at the reference point-in-time), deleted, and future files and directories to be distinguished from each other. For example, in the embodiment depicted, the names of the current files and directories (e.g., in existence in the backup made at Mar. 28, 2023 5:45:00 PM) are shown in a standard font, the names of the file (FILE 2.TXT) and directory (DIR 2) that were deleted prior to the reference point-in-time are shown with strikeout formatting, and the name of the file (FILE 5.TXT) created after the reference point-in-time is shown with underline formatting. In various embodiments, any other suitable formatting may be used. For example, the names and/or icons representing the directories or directories may be displayed in different colors and/or may be highlighted using different colors or effects.

In some instances, a reference point-in-time is specified but a time range is not specified. In such instances, the time range for determining which deleted files and directories and future files and directories to display in file explorer portion 604 may include the points of time of all of the available backups for the storage collection. However, when a range is specified, the deleted files and directories and future files and directories displayed in file explorer portion 604 may be filtered based on the range. For example, files and directories deleted prior to the starting point-in-time as well as files and directories created after the ending point-in-time may be omitted from the file explorer portion 604.

When a file or directory is selected, hovered over by a mouse pointer, or receives other suitable interaction from the user, any suitable information associated with the file or directory may be displayed. In the embodiment depicted, FILE 1.TXT is selected as indicated by its background highlighting. Responsive to this selection, restoration portion 606 is displayed. Restoration portion 606 includes a list of the storage backups that include the selected file and the point-in-times of those backups. In various embodiments, the restoration portion 606 may be constructed (e.g., by backup engine 110 or other suitable logic) based on the entries of the storage backup log 500 for the file. Radio buttons are present next to the points in time allowing the user to select one of the backups from which the file may be restored (e.g., to its original location or to another location selected by the user), e.g., responsive to selection of button 612. The restoration portion 606 also displays the size of each file backup as well as the date on which the file was last modified at the source location. The date the file was last modified may be different from the date of the backup.

In some instances, only unique versions of the file are shown to the user in the multiple point-in-time file system explorer 600 (e.g., where the unique versions may be determined by entries for the file stored in the storage backup log 500). Thus, in the embodiment depicted, the versions available in the backups on Mar. 21, 2023 and Mar. 28, 2023 may be omitted in an alternative embodiment.

In other embodiments, any suitable information may additionally or alternatively be displayed in the multiple point-in-time file system explorer 600 responsive to the selection of a file or directory, whether displayed within restoration portion 606 or within another portion of the multiple point-in-time file system explorer 600. For example, the hashes or version numbers associated with the different versions of the files or the time the file or directory was created at the source may be displayed in some embodiments.

Multiple point-in-time file system explorer 600 may also allow for various filtering options to be applied to the files and directories that are displayed by the 600. For example, the user may be able to filter files or directories based on the creation time, updated time, deleted time, file size, or other suitable criteria.

Figure 7:
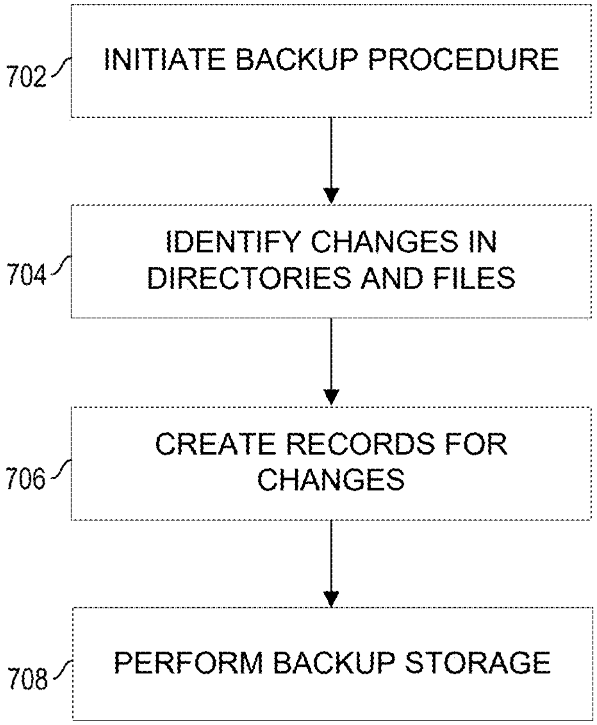
FIG. 7 illustrates a flow for updating a storage backup log for a multiple point-in-time file system explorer, in accordance with any of the embodiments disclosed herein.

FIG. 7 illustrates a flow for updating a storage backup log for a multiple point-in-time file system explorer, in accordance with any of the embodiments disclosed herein. Operations of the flow may be performed by the backup engine 110, a backend 106, one or more computing devices 102, other suitable logic, and/or a combination thereof.

At 702, a backup procedure is initiated. The backup procedure may be initiated in response to reception of a storage backup request from a user of a computing devices 102, a scheduled backup for a previously entered backup request, or some other trigger. A storage backup request may identify a data collection comprising files and directories that are to be backed up. The collection may include at least a portion of at least one file system. The collection may include all or a portion of the files and directories stored by one or more physical machines, virtual machines, storage drives, server pools, or other storage collection of one or more computing devices.

At 704, the data collection is scanned to identify changes in files and directories since the last backup was performed on the data collection. Changes may include, e.g., addition or deletion of files or directories, updating of names or contents of files or directories, or changes in location of files or directories.

At 706, records are created for the changes. The records may be added to a storage backup log (e.g., 500 or a variation thereof) that is kept for backups of the data collection.

At 708, the data collection is backed up. For example, a full, incremental, or differential backup may be performed. In some instances, the backup engine 110 may perform the backup (e.g., by copying files to a backend 106). In other instances, some other logic (e.g., any suitable backup tool) may perform the backup.

Figure 8:
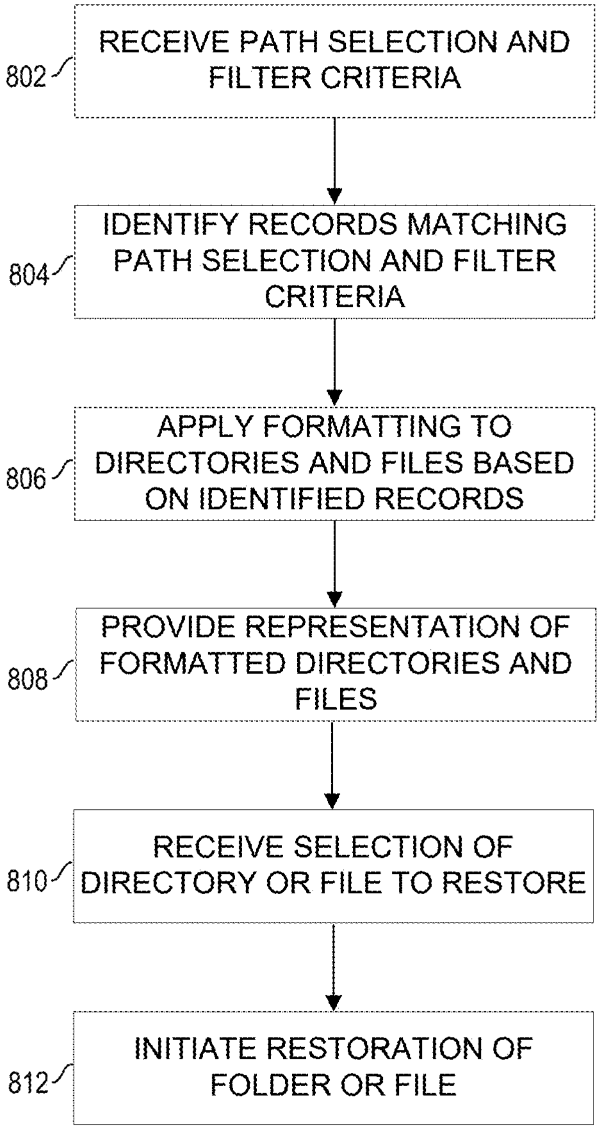
FIG. 8 illustrates a flow for providing a multiple point-in-time file system explorer, in accordance with any of the embodiments disclosed herein.

FIG. 8 illustrates a flow for providing a multiple point-in-time file system explorer, in accordance with any of the embodiments disclosed herein. Operations of the flow may be performed by the backup engine 110, a backend 106, one or more computing devices 102, other suitable logic, and/or a combination thereof.

At 802, a path selection and filter criteria are received. For example, a user may utilize a multiple point-in-time file system explorer (e.g., 402, 600, or variant thereof) executed on a computing device 102 to select a file path to view. The user may also specify one or more filter criteria. The filter criteria may include one or more of a reference point-in-time, a starting point-in-time, and ending point-in-time, creation time, updated time, deleted time, file size, or other suitable criteria.

At 804, records matching the path selection and the filter criteria are identified. In various embodiments, the records may be identified from a storage backup log 500. For example, these records may include information specifying which files and directories were included at that path in backups performed at various point-in-times. The information may also indicate that some of these files or directories were deleted prior to a reference point-in-time or created after the reference point-in-time.

At 806, formatting is applied to one or more directories and/or files based on the identified records. For example, a first format may be applied to files and directories existing at the reference point-in-time, a second format may be applied to files and directories that had been deleted prior to the reference point-in-time, and a third format may be applied to files and directories that were created after the reference point-in-time.

At 808, a representation of the formatted directories and files is provided. For example, the representation of the formatted directories and files may be provided by the data backup and search system 108 or other logic of cloud data backup environment 100 to a computing device 102 in any suitable format allowing the data backup and search system 108 to display the multiple point-in-time file system explorer. For example, the representation may be provided in HyperText Markup Language, JavaScript Object Notation, extensible Markup Language, JavaScript, or other suitable format. Similarly, such a representation may also be provided by circuitry of a computing device 102 (e.g., that receives the representation from data backup and search system 108 or generates a displayable representation based on information received from data backup and search system 108) to other circuitry of computing device 102 for display by the computing device 102.

At 810, a selection of a directory or a file to restore is received. For example, a user may select a version of the directory or file to restore from the multiple point-in-time file system explorer (e.g., by selecting the particular point-in-time of one of the backups of the directory or file). At 812, restoration of the directory or file is initiated. For example, the data backup and search system 108 may communicate with a backend 106 to cause the file or directory to be restored to the source or other location specified by a user.

It is important to note that the operations in FIGS. 7-8 illustrate only some of the possible scenarios that may be executed by, or within, the various components of the systems described herein. Some of these operations may be removed or repeated where appropriate, or these steps may be modified or changed considerably without departing from the scope of the present disclosure. In addition, the timing of these operations may be altered considerably. The preceding operational flows have been offered for purposes of example and discussion.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used in the description of the example embodiments and the appended examples, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. For example, the phrase "A and/or B" means (A), (B), or (A and B), while the phrase "A, B, and/or C" means (A), (B), (C), (A and B), (A and C), (B and C), or (A, B, and C).

As used throughout this description, and in the claims, a list of items joined by the term "at least one of" or "one or more of" can mean any combination of the listed terms.

What is claimed is:

1. A method, comprising:

responsive to a request, accessing a storage backup log, the storage backup log comprising indications of changes to files of a plurality of storage backups relative to previous storage backups, wherein each storage backup of the plurality of storage backups is associated with a different point-in-time; and responsive to the request, utilizing the storage backup log to generate a representation of at least a portion of a file system at multiple points in time, wherein the representation includes indications of a first file in existence at a point-in-time, a second file deleted prior to the point-in-time, and a third file created after the point-in-time, wherein generating the representation comprises: (i) receiving, as part of the request, a path selection and at least one filter criterion comprising the point-in-time as a reference point-in-time; (ii) identifying, from the storage backup log, records matching the path selection and the at least one filter criterion; (iii) applying formatting to at least one of directories and files based on the identified records; and (iv) providing, to a computing device, a representation of the at least one of directories and files after applying the formatting.

2. The method of claim 1, wherein the storage backup log also comprises indications of changes to directories of the plurality of storage backups and the representation further includes at least one of a directory that was deleted prior to the point-in-time or a directory created after the point-in-time.

3. The method of claim 1, wherein the request specifies the point-in-time, wherein the point-in-time is the time a particular storage backup of the plurality of storage backups was performed.

4. The method of claim 3, wherein the request further includes a starting point-in-time and an ending point-in-time, wherein the representation of at least the portion of the file system at multiple points in time is referenced to the point-in-time and bounded by the starting point-in-time and the ending point-in-time.

5. The method of claim 1, wherein the representation also includes an indication of a time of a most recent modification of the first file, wherein the time of the most recent modification of the first file is different from the point-in-time of the storage backup.

6. The method of claim 1, wherein the representation includes a specification of a first display format for files deleted prior to the point-in-time and a second display format for files created after the point-in-time, wherein the first display format is different from the second display format.

7. The method of claim 1, wherein the request further specifies a file path and wherein the representation is based on the file path.

8. The method of claim 1, further comprising storing the storage backup log in a relational database, wherein a record of the relational database includes a point-in-time and corresponds to a change to a file or directory for a storage backup performed at that point-in-time.

9. The method of claim 8, wherein the record further includes an update time, a file size, and a hash of content of a file.

10. The method of claim 1, further comprising restoring at least one of the first file, the second file, and the third file responsive to a user selection in an interface displaying the representation.

11. An apparatus comprising:

a storage device to store a storage backup log, the storage backup log comprising indications of changes to files of a plurality of storage backups relative to previous storage backups, wherein each storage backup of the plurality of storage backups is associated with a different point-in-time;

a communication interface to receive a request associated with a file explorer; and at least one processor to:

responsive to the request, utilizing the storage backup log to generate a representation of at least a portion of a file system at multiple points in time, wherein the representation includes indications of a first file in existence at a point-in-time, a second file deleted prior to the point-in-time, and a third file created after the point-in-time, wherein generating the representation comprises: (i) receiving, as part of the request, a path selection and at least one filter criterion comprising the point-in-time as a reference point-in-time; (ii) identifying, from the storage backup log, records matching the path selection and the at least one filter criterion; (iii) applying formatting to at least one of directories and files based on the identified records; and (iv) providing, to a computing device, a representation of the at least one of directories and files after applying the formatting.

12. The apparatus of claim 11, wherein the storage backup log also comprises indications of changes to directories of the plurality of storage backups and the representation further includes at least one of a directory that was deleted prior to the point-in-time or a directory created after the point-in-time.

13. The apparatus of claim 11, wherein the request specifies the point-in-time, wherein the point-in-time is the time a particular storage backup of the plurality of storage backups was performed.

14. The apparatus of claim 13, wherein the request further includes a starting point-in-time and an ending point-in-time, wherein the representation of at least the portion of the file system at multiple points in time is referenced to the point-in-time and bounded by the starting point-in-time and the ending point-in-time.

15. The apparatus of claim 11, wherein the representation includes a specification of a first display format for files deleted prior to the point-in-time and a second display format for files created after the point-in-time, wherein the first display format is different from the second display format.

16. At least one computer-readable non-transitory media comprising one or more instructions that when executed by at least one processor configure the at least one processor to cause performance of operations comprising:

responsive to a request, accessing a storage backup log, the storage backup log comprising indications of changes to files of a plurality of storage backups relative to previous storage backups, wherein each storage backup of the plurality of storage backups is associated with a different point-in-time; and responsive to the request, utilizing the storage backup log to generate a representation of at least a portion of a file system at multiple points in time, wherein the representation includes indications of a first file in existence at a point-in-time, a second file deleted prior to the point-in-time, and a third file created after the point-in-time, wherein generating the representation comprises: (i) receiving, as part of the request, a path selection and at least one filter criterion comprising the point-in-time as a reference point-in-time; (ii) identifying, from the storage backup log, records matching the path selection and the at least one filter criterion; (iii) applying formatting to at least one of directories and files based on the identified records; and (iv) providing, to a computing device, a representation of the at least one of directories and files after applying the formatting.

17. The at least one computer-readable non-transitory media of claim 16, wherein the storage backup log also comprises indications of changes to directories of the plurality of storage backups and the representation further includes at least one of a directory that was deleted prior to the point-in-time or a directory created after the point-in-time.

18. The at least one computer-readable non-transitory media of claim 16, wherein the request specifies the point-in-time, wherein the point-in-time is the time a particular storage backup of the plurality of storage backups was performed.

19. The at least one computer-readable non-transitory media of claim 18, wherein the request further includes a starting point-in-time and an ending point-in-time, wherein the representation of at least the portion of the file system at multiple points in time is referenced to the point of time and bounded by the starting point-in-time and the ending point-in-time.

20. The at least one computer-readable non-transitory media of claim 16, wherein the representation includes a specification of a first display format for files deleted prior to the point-in-time and a second display format for files created after the point-in-time, wherein the first display format is different from the second display format.

* * * * *